United States Patent [19]

Giannetti et al.

[11] Patent Number: 4,789,717
[45] Date of Patent: Dec. 6, 1988

[54] PROCESS FOR THE POLYMERIZATION IN AQUEOUS DISPERSION OF FLUORINATED MONOMERS

[75] Inventors: Enzo Giannetti, Novara; Angelo Rotasperti, Galbiate; Enrico Marchese, Asti, all of Italy

[73] Assignee: Ausimont S.p.A., Milan, Italy

[21] Appl. No.: 41,527

[22] Filed: Apr. 23, 1987

[51] Int. Cl.$^4$ .............................................. C08F 2/00
[52] U.S. Cl. ...................................... 526/209; 526/254
[58] Field of Search .............................. 526/209, 254

[56] References Cited

U.S. PATENT DOCUMENTS

| 3,132,123 | 5/1964 | Harris, Jr. et al. | 526/247 |
|---|---|---|---|
| 3,132,124 | 5/1964 | Couture et al. | 526/80 |
| 3,665,041 | 5/1972 | Sianesi et al. | 568/416 |
| 3,869,465 | 3/1975 | Waldmann | 524/159 |
| 4,369,266 | 1/1983 | Kuhls et al. | 524/463 |
| 4,381,387 | 4/1983 | Sulzbach | 526/247 |
| 4,523,039 | 6/1985 | Lagow et al. | 568/615 |

OTHER PUBLICATIONS

CA 100(10):71067w, Caporiccio et al., "Lubricating Greases", 1983.
CA 103(6):38672d, Nippon Mectron Co., Ltd., "Polyperfluoroether Emulsion", 1985.
McCutcheon's Emulsifiers & Detergents–1982, p. 84.

Primary Examiner—Joseph L. Schofer
Assistant Examiner—N. Sarofim
Attorney, Agent, or Firm—Stevens, Davis, Miller & Mosher

[57] ABSTRACT

A process for polymerizing or copolymerizing fluorinated monomers, in an aqueous dispersion, by the use of radicalic starters and of fluorinated surfactants, characterized in that it is operated in the presence of perfluoropolyether having neutral end groups, being liquid under the polymerization conditions and in the form of an aqueous emulsions, in order to increase the polymerization rate.

3 Claims, No Drawings

PROCESS FOR THE POLYMERIZATION IN AQUEOUS DISPERSION OF FLUORINATED MONOMERS

BACKGROUND OF THE INVENTION

The present invention relates to a process for polymerizing and copolymerizing fluorinated monomers, in an aqueous dispersion, in the presence of radicalic starters, characterized in particular by a polymerization rate which is much higher than the one attainable in the conventional processes under analogous operative conditions.

As is well known, the fluoroolefins have each a different reactivity in the polymerization processes, some of them having a very low or no reactivity when compared with tetrafluoroethylene (TFE). Reference can be made in this connection for example to $C_3F_6$.

Also some perfluorovinylethers exhibit a very low reactivity in polymerization as compared with other fluoroolefins, in particular TFE.

This behaviour leads to the fact that in order to prepare copolymers from comonomers having a very different reactivity from one another, it is necessary to operate with a high concentration of the less reactive monomer and therefore to operate at a very high partial pressure of said comonomer.

For example, when the thermoplastic copolymer $C_2F_4$—$C_3F_6$ (FEP) with 5%-25% by weight of $C_3F_6$ is to be prepared, it is necessary to operate with a high concentration of $C_3F_6$ in the gas phase corresponding to a total pressure of the monomers from 35 to 40 kg/cm² abs. (See U.S. Pat. No. 3,132,124).

There was the requirement to increase the polymerization rate for the low reactive monomers in order to avoid to operate at very high pressures and in order to shorten, at the same time, the polymerization times.

THE PRESENT INVENTION

It has now surprisingly been found that the polymerization or copolymerization of fluorinated monomers in an aqueous dispersion (in particular in emulsion), by the use of radicalic starters and of fluorinated surfactacts is considerably accelerated if it is operated in the presence of a perfluoropolyether which has neutral end groups, is liquid under the polymerization conditions, exhibits a viscosity of at least 1 cSt at 25° C. and is in the form of an aqueous emulsion. Any perfluoropolyether consisting of sequences of perfluoro-oxyalkylene units and having the abovesaid characteristics can be advantageously utilized.

The mean molecular weights of the perfluoropolyethers can vary over a wide range, from 300 up to very high values, provided the cited conditions are obtained. In general, values up to 15,000 or 20,000 or even higher are suitable.

In the process of the invention, however, it is preferable to use perfluoropolyethers having a molecular weight from 300 to 2,000, with a boiling range between 150° and 250° C. and preferably between 170° and 200° C., as in the subsequent polymer finishing treatments these are supposed to be easier to remove because of their volatility.

Suitable perfluoropolyethers are, for example, the ones of the following classes:

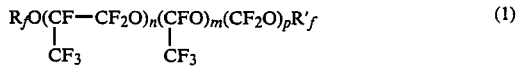

with a random distribution of the perfluoro-oxyalkylene units, where $R_f$ and $R'_f$, like or different from each other, are —$CF_3$, —$C_2F_5$, —$C_3F_7$ and m, n, p hase such mean values as to meet the abovesaid required characteristics of mean molecular weight, viscosity, etc.

with a random distribution of the perfluoro-oxyalkylene units, where $R_f$ and $R'_f$, either like or different from each other, are —$CF_3$ or —$C_2F_5$ and m and n have such mean values as to meet the abovesaid requirements.

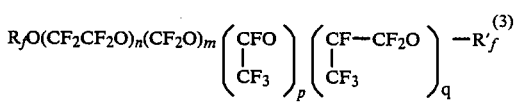

with a random distribution of the perfluoro-oxyalkylene units, where $R_f$ and $R'_f$, either like or different from each other, are —$CF_3$, —$C_2F_5$ or —$C_3F_7$, and m, n, p, q have such mean values as to meet the abovesaid requirements.

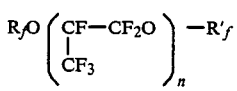

where $R_f$ or $R'_f$, either like or different from each other, are —$C_2F_5$ or —$C_3F_7$, and n has such a value as to meet the abovesaid requirements.

where $R_f$ and $R'_f$, like or different from each other, are —$CF_3$, —$C_2F_5$, and n has such a mean value as to meet the abovesaid requirements.

where $R_f$ and $R'_f$, equal to or different from each other, are —$CF_3$ or —$C_2F_5$ or —$C_3F_7$, n having such a mean value as to meet the abovesaid requirements.

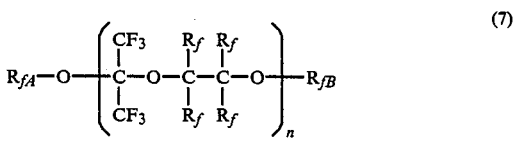

and

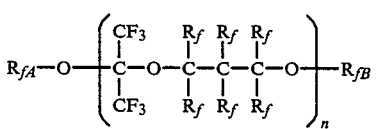

where $R_f$ is F or perfluoroalkyl, $R_{fA}$ and $R_{fB}$ either like or different from each other are perfluoroalkyl, and n has such mean values as to meet the abovesaid characteristics.

Perfluoropolyethers of class (1) are commercially available under the trademark Fomblin ® Y or Galden ®, the ones of class (2), under the trademark Fomblin ® Z, all of them being ufactured by Montedison S.p.A.

Commercially available products of class (4) are the Krytox (Du Pont). Those of class (5) are described in U.S. Pat. No. 4,523,039. Those of class (6) are described in European patent EP No. 148,482 to Daikin. Those of class (7) are described i Pat. Application WO No. 87/00538 (Lagow).

The products of class (3) are prepared according to U.S. Pat. No. 3,665,041.

Other suitable perfluoropolyethers are the ones described by Lagow et al. in U.S. Pat. No. 4,523,039 or in J. Am. Chem. Soc. 1985, 107, 1197–1201.

The mechanism of action of said perfluoropolyethers is not yet clear. However, the effect of their presence in the aqueous dispersion could be ascribed to the fact that they substantially promote the nucleation and thereby substantially raise the number of sites which are active in the (co) polymerization in aqueous dispersion of fluorinated monomers.

Furthermore, it can be assumed that perfluoropolyether increases the solubility of the monomers, so facilitating the transfer thereof to the reaction site.

The perfluoropolyether amount to be used in the process of the invention is very low. Already with an amount of the order of 0.1 ml per liter of starting aqueous solution it is possible to obtain good results. The preferred amount is of the order of 0.2–4 ml per liter of aqueous solution.

It was known that in the polymerization in aqueous dispersion of fluorinated olefins the addition of fluorinated or chlorofluorinated hydrocarbons increases the polymerization rate.

Examples of these compounds are: $CCl_2F_2$, $CCl_3F$, $CCl_2F-CClF_2$ and in general the products which are commercially known as Freon. (See e.g. U.S. Pat. No. 3,635,926).

In consideration of their high volatility, such compounds are to be utilized in considerable amounts in order to guarantee their presence in the aqueous phase.

Moreover, their high volatility (i. e. high vapor pressure) causes a reduction in the partial pressure of the (co)monomers, at a given total pressure.

Their presence in the gaseous monomers leads to considerable complications as regards the recovery of the monomers at the end of the polymerization.

In addition, these fluoro(chloro)hydrocarbons can have undesired chain-transfer effects, giving rise to (co)polymers having a too low molecular weight.

The above-mentioned drawbacks do not occur with the perfluoropolyethers of the invention, which have a much lower volatility, do never cause chain-transfer phenomena and are utilized in a considerably lower amount that the one required with the abovesaid chlorofluorinated hydrocarbons.

Furthermore, under the same conditions, the increase in the polymerization rate is by far higher.

As radicalic starters it is possible to use any type which is known for the polymerization in aqueous dispersion of the fluorinated monomers.

Peroxidized compounds in general, both inorganic and organic, are suitable: among the former there are particularly suitable the potassium or ammonium persulphates. As organic peroxides there are suitable the water-soluble ones, such as disuccinyl peroxide, as well as the water-insoluble ones (see e.g. EP No. 75,312). It is possible also to use the known radicalic starters of the type of the azocompounds, such as, for example, the ones described in U.S. Pat. Nos. 2,515,628 and 2,520,338. If it is desired to operate at low polymerization temperatures (for example from 10° to 50° C.), a redox-type starter can be utilized.

The radicalic starter amount is like the one which is usually employed in the polymerization of fluoroolefins: it ranges from 0.003% to 2% by weight referred to the total amount of polymerized monomers.

The radicalic starter or optionally the components of the redox system can be all introduced into the reactor at the beginning, or they can be added batchwise during the polymerization.

Suitable surfactants are the ones which are known for this type of polymerization, which consist of perfluorinated compounds, in particular those having 6 to 11 carbon atoms, of the class of the carboxylic or sulphonic acids.

Further suitable surfactants are those of the class of the perfluoropolyethers having an acid end group.

The latter class of surfactants offers the advantage that during the subsequent processing, at high temperatures, of the obtained polymer (extrusion or injection molding or sintering treatments), the surfactants of this type do not give rise to any coloring of the polymer, as conversely occurs with the usual surfactants, such as ammonium perfluoro-octanoate, which require a subsequent whitening of the polymer.

Perfluoropolyether must be introduced into the aqueous phase at the begin of polymerization and in such way as to cause it to be finely dispersed in water. An advantageous operative method comprises dispersing the perfluoropolyether in water under an intense mechanical agitation, with subsequent addition of the surfactact in order to stabllize the aqueous dispersion. This method permits to avoid an intense stirring in the presence of surfactants, so preventing the generation of a great amount of foam. Then the other ingredients (monomers, starters, molecular weight modifiers, if any) are introduced into the aqueous dispersion.

The polymerization process in aqueous dispersion of the present invention is advantageously utilizable also in the preparation of copolymers of $C_2F_4$ of the following classes:

polytetrafluoroethylene of the "modified" type, i. e. containing little amounts, lower than 0.5% by mols, of one or more comonomers such as for example: perfluoropropene, perfluoroalkyl-perfluorovinylethers, vinylidene fluoride, hexafluoroisobutene;

thermoplastic copolymers comprising the copolymers containing up to 30% by weight, preferably from 7 to 27% by weight of $C_3F_6$ (type FEP of DuPont), the ones containing from 2 to 4% by weight of perfluoroalkylperfluorovinylethers (type PFA), the ones containing a high amount of $C_2H_4$ plus a third comonomer of the fluorinated type (such as Tefzel of DuPont, Halon ET of Allied);

elastomeric copolymers containing from 20% to 50% by mols of perfluoroalkylperfluorovinylether (or of perfluorooxyalkylperfluorovinylether) and a cure site monomer, for example Kalrez of DuPont.

It is possible to prepare also vinylidene fluoride (VDF) elastomers, perfluoroalkylvinylethers, TFE and cure site monomers.

As a further case in which the polymerization process of the invention can be usefully utilized there can be cited: the thermoplastic copolymer ClFC=CF$_2$/ethylene (type Halar).

The process according to the invention offers particular advantages in the preparation of thermoplastic copolymer C$_2$F$_4$/C$_3$F$_6$, hereinafter referred to as FEP. This type of copolymer, which is broadly known, has a content of C$_3$F$_6$ usually varying from 7% to 27% by weight.

The percentage of C$_3$F$_6$ of can be determined in the copolymer on the basis of the ratio between the absorbances (hereinafter referred to as specific absorbance ratio) of the two I.R. bands at 983 and 2353 cm$^{-1}$. To obtain the abovesaid C$_3$F$_6$ percentage in the copolymer, in view of the very low polymerization reactivity of C$_3$F$_6$ in comparison with C$_2$F$_4$, the percentage of C$_3$F$_6$ in the monomer mixture to be subjected to polymerization must be high, practically from 30% to 90% by mols.

U.S. Pat. No. 3,132,124 describes in detail an optimized procedure for copolymerizing C$_2$F$_4$ with C$_3$F$_6$ in an aqueous dispersion. According to such procedure, the copolymerization reaction is preferably conducted at a pressure of the gaseous mixture of reacting monomers ranging from 39 to 41 atm. and at a temperature from 90° to 120° C. The composition of the reacting mixture necessary to obtain a copolymer having a specific absorbance ratio of 3.5 (corresponding to a maximum in the peak of the second melting endotherm determined by DSC of about 267° C.) ranges from 70 to 78% by weight of C$_3$F$_6$. Under these polymerization conditions, the reaction gaseous mixture has a density of 0.20–0.25 g/ml.

It has been ascertained that at such a high density of the vapour phase, the substance transfer between the gas phase and the aqueous dispersion becomes highly depending on the mixture composition, in particular, with the high percentages of C$_3$F$_6$ in the gaseous mixture, which are necessary in order to obtain copolymers having the desired composition, the substance transfer becomes very difficult. It is possible to overcome this drawback by means of an intense stirring: such intense stirring, however, is accompanied by the risk of causing a too early coagulation of the aqueous emulsion of the copolymer al ready formed.

The use of liquid chlorofluorohydrocarbons with a view to increasing the rate of polymerization in aqueous emulsion in the case of the C$_2$F$_4$/C$_2$F$_3$—O—C$_3$F$_7$ copolymer is described in the above-cited U.S. Pat. No. 3,635,926. The use of the compounds indicated in this patent leads to serious drawbacks, as already mentioned.

The use of perfluoropolyethers according to the present invention permits to carry out the copolymerization of C$_2$F$_4$/C$_3$F$_6$ at a total pressure of only 20 atm., thereby obtaining, with reaction times of 60–80 minutes, aqueous dispersion containing more than 20% by weight of copolymer.

A further advantage deriving from the use of the perfluoropolyethers is the increased utilization degree of the comonomers, so that the comonomer amount to be recovered and recycled is considerably lower. Merely by way of example, U.S. Pat. No. 3,132,124 teaches that the amount of HFP in the gaseous reaction mixture which is usually required to obtain the TFE/HFP copolymers having a specific absorbance ratio equal to 3,5 ranges from 60 to 70% by mols if it is operated at 95° C. add at 39–41 atm. The addition of little amounts of a perfluoropolyether according to the invention permits to obtain a TFE/HFP copolymer having the safe specific absorbance ratio by operating at 20 atm. and with a reaction mixture containing a HFP amount varying from 55 to 65% by mols. The possibility of operating at considerably lower pressures than the ones indicated for the preparation in aqueous dispersion of TFE/HFP copolymers and with gaseous mixtures containing lower amounts of HFP sensibly reduces the density of the gaseous reaction mixtures. In particular, it is possible to operate under such conditions, in which the gaseous reaction mixture has a density lower than 0.10 g/ml. In this way, the substance transfer between the gas phase and the reacting aqueous dispersion is greatly favoured.

The following examples are given merely to illustrate some of the possible practical embodiments of the process according to the invention.

The following methods of analysis and of characterization have been adopted in order to determine the properties of the polymeric materials obtained in the examples.

(a) The melting starting temperature, the melting peak temperature and the melting end temperature were determined by differential calorimetry using a Perkin-Elmer instrument type DSC IV. About 10 g of copolymer are heated from room temperature up to 350° C. at a heating rate of 10° C./minute.

The polymer is cooled to room temperature at a rate of 10° C./minute and heated again to 350° C. at the same heating rate.

The temperature corresponding to the maximum of the melting endotherm is hereinafter referred to as second melting peak.

(b) The HFP content of the polymer is determined by FTIR spectroscopy by means of a Nicolet instrument, mod. 20SXB on a thin film of 0.05 mm±0.01 mm, obtained by extrusion at 340° C.

The ratio between the absorbance of the characteristic band of HFP at 983 cm$^{-1}$ and the absorbance of the check band 2353 cm$^{-1}$ is indicated hereinafter as specific absorbance ratio. The % by weight content of HFP is calculated through suitable calibration obtained on the base of a differential mass balance.

(c) To determine the viscosity of the melt or the melt flow index (MFI) there is used the apparatus described in ASTM method D-1238-65T, the cylinder, the piston and the outlet nozzle, however, being manufactured from a corrosion-proof material. The outlet inside diameter of the nozzle, which is 8 mm long, is of 2.0955 mm. The diameter of the cylinder is equal to 0.95 cm. A certain amount of polymer is molten in the cylinder and is maintained at 372° C. for about 10 minutes. The molten polymer is then extruded through the nozzle in 10 minutes. To obtain the apparent viscosity of the molten polymer, expressed in Poise, it is sufficient to divide 53,500 by the MFI value.

(d) The volatility index (V.I.) is determined by weighing 10 g of resin on an aluminium sheet, which is placed into a glass flask connected with a vacuum system. Vacuum (2 mm Hg) is created in the flask and, once the equilibrium has been reached, the flask is heated to 380° C. The pressure in the flask is recorded in the time. The volatility index is calculated through the following formula:

$$V.I. = \frac{(P_{40} - P_0) V}{10}$$

where $P_0$ and $P_{40}$ is the pressure in the flask at time 0 and after 40 minutes, respectively, and V is the volume of the flask. The volume of the flask is equal to $121 \pm 0.2$ cm$^3$.

(e) The mean diameter of the particles is measured by means of a Coulter nano sizer by laser light diffusion. A latex sample is diluted from 1 to 100 and filtered on a 1.0 micron Millipore filter. Six measures are carried out, the minimum and maximum values are discarded add the arithmetical mean of the values so found is considered as the value of the particles' mean diameter. The data are well in accordance with the ones found through transmission electron microscopy.

(f) The polymeric resin is extruded, by means of an extruder Brabender Plasticord PL 651, to cylindrical pellets of about 3.5 mm diameter and 1.5–3 mm thickness. The colour of the extruded granules is determined by projecting white light through the sample, causing the reflected light to pass through a set of filters and measuring at last the intensity thereof. A high percentage of reflected green light is indicative of a high whiteness. The utilized colorimeter is a Gardner XL10A apparatus.

EXAMPLE 1

8 ml of Galden LS -215 (average m.w. 600, boiling p. 215° C.) were added to 250 ml of distilled H$_2$O. The suspension was stirred for 5 minutes by means of an Ul-traturra ® stirrer, mod. T65 (10,000 rpm) manufactured by IKA Werke. There was added an aqueous solution containing 4 g of

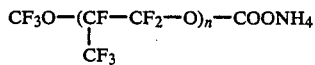

having an acidimetric equivalent molecular weight equal to 690. The resulting emulsion was further homogenized for 5 minutes, whereafter is was charged into an AISI 316 steel autoclave, having a 4.2 l volume, wherein vacuum was previously created. Distilled water was added up to a total volume of 2,000 ml. The temperature in the autoclave was brought to 95° C.; it was pressurized to 20 kg/cm$^2$ gauge with a gaseous mixture containing 62% by mols of C$_3$F$_6$ and 38% by mols of C$_2$F$_4$. 62 ml of an aqueous solution prepared by dissolving 0.73 g of (NH$_4$)$_2$S$_2$O$_8$ and 0.7 g of K$_2$S$_2$O$_8$ in 500 ml of H 0 were then charged into the autoclave. As soon as the pressure in the autoclave tends to sink, it is restored by feeding, through a compressor, a C$_3$F$_6$/C$_2$F$_4$ mixture containing 7.6% by mols of hexafluoroprene. After 15 minutes, the abovecited persulphate solution was fed at a rate of 88 ml/h. Stirring was continued for 65 minutes in the reactor. At the end of such period of 65 minutes, stirring was stopped and the reactor content was discharged.

An aqueous dispersion containing 230 g/l of a polymeric resin was obtained.

The aqueous dispersion was coagulated by means of stirring and was filtered, the solid product was repeatedly washed with distilled water and dried in a ventilated oven at 200° C. The product had a specific viscosity in the molten form equal to $1.063 \times 10^6$ poises, M.F.I. (melt flow index)=0.5 g/10 minutes, and exhibited a second melting peak at 264.9° C. The powder obtained was extruded in a Brabender single-screw extruder: perfectly white and regular granules were obtained. The product did not require any further stabilizing and whitening treatments. The thermovolatility index was equal to 60 and the whiteness was equal to 71.

EXAMPLE 2

It was operated as in example 1, but using 2 ml of Galden LS After a 70-minute reaction, stirring was stopped, it was vented out, and the latex was discharged. An aqueous dispersion containing 210 g/lof a polymeric resin was obtained. The mean diameter of the particles, determined by laser light diffusion, was equal to 0.104 μm.

The powder obtained by coagulation had a specific viscosity in the molten state equal to $3.45 \times 10^6$ poises, and a second melting peak at 267.3 ° C. The polymer extruded in the form of granules was white and the volatility index was equal to 58.

EXAMPLE 3

It was operated as in example 1, using, as a surfactant, the potassic salt of the perfluoro-octansulphonic acid (Fluorad FC95 of 3M) in an amount equal to 1 g/l. After 65 minutes the reaction was stopped and an aqueous dispersion containing 261 g/l of polymer was obtained. The coagulated powder had a M.F.I. of 0.41 (corresponding to a specific viscosity in the molten state of $1.30 \times 10^6$ poises), a second melting peak at 257.2° C. and a specific absorbance ratio of 3.6.

EXAMPLE 4

It was operated as in example 1, using as a surfactant the ammonium salt of the perfluoro-octanoic acid (3 g/l). After 60 minutes the reaction was stopped. An aqueous dispersion containing 240 g/l of polymer was obtained. The coagulated powder exhibited a M.F.I. of 0.31 g/10 minutes, a specific viscosity in the molten state of $1.71 \times 10^6$, a specific absorbance ratio of 3.5 and a second melting peak at 267.1° C.

EXAMPLE 5

It was operated as in example 1, using Galden DO2 (average m.w. 450, b.p. 175°) (4 ml/l). After 80 minutes the reaction was stopped. A latex containing 265 g/l of polymeric resin was obtained. The coagulated powder had a M.F.I. of 0.87, a second melting peak at 266.8 ° C. and a specific absorbance ratio of 3.5. The extruded granules had a volatility index equal to 45.

EXAMPLE 6 (comparative test)

It was operated as in example 1, but without adding perfluoropolyether. After 80 minutes the reaction was stopped. A latex was discharged, which had a mean diameter of the particles equal to 0.114 μm and a polymeric resin content of 110 g/l. The coagulated powder had a M.F.I. equal to 14.64, a specific absorbance ratio of 3.4 and a second melting peak at 270° C.

EXAMPLE 7

It was operated as in example 1, adding 0.3 atm. of H$_2$. After 60 minutes the reaction was stopped. Obtained was a latex having a mean diameter of the paticles equal to 0.072 μm and a polymeric resin content of 225 g/l. The coagulated powder had a M.F.I. equal to 0.66, a specific absorbance ratio of .5 and a second melting peak at 267.5° C.

EXAMPLE 8

It was operated as in example 7, adding 0.6 atm. of $H_2$. After 73 minutes the reaction was stopped. The latex obtained had a mean diameter of the particles equal to 0.077 μm and a polymeric resin content of 230 g/l. The coagulated powder had a M.F.I. of 1.0, a specific absorbance ratio of 3.5 and a second melting peak at 264.5° C.

EXAMPLE 9

It was operated as in example 1, adding 1.2 atm. of $H_2$. After 80 minutes the reaction was stopped. A latex was obtained, which had a mean diameter of the particles equal to 0.080 μm and a polymeric resin content of 220 g/l. The coagulated powder had a M.F.I. of 2.25.

EXAMPLE 10

It was operated as in example 1, adding 0.3 atm. of $CF_2H$—$CH_3$. After 80 minutes the reaction was stopped. A latex was obtained, which contained 230 g/l of polymric resin and exhibited a mean diameter of the particles equal to 0.082 μm. The coagulated powder had a M.F.I. of 1.89 and a second melting peak at 264° C.

EXAMPLE 11 (comparative test)

It was operated as in example 1, adding 4 1ml of Freon 113 instead of perflouropolyether. After 105 minumtes the reaction was stopped. A latex was discharged, which had a mean diameter of the particles of 0.11 μm and a polymeric resin content of 183 g/l. The coagulated powder had a M.F.I. equal to 1.74, a specific absorbance ration of 3.6 and a second melting peak at 264° C. The extruded and granulated powder had a V. I. equal to 72.

What we claim is:

1. A process for polymerizing or copolymerizing fluorinated monomers in an aqueous dispersion, by using redicalic starters and fluorinated surfactants, characterized in that it is operated in the presence of perfluoropolyethers in an amount not lower than 0.1 ml per liter of the starting aqueous solution, said perflouropolyethers being liquid under the polymerization conditions and having a mean molecular weight not lower than 300 and a viscosity of at least 1 cSt at 25° C., and being selected from the following classes:

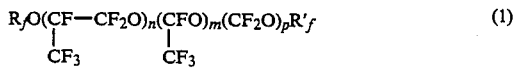

having a random distribution of the perfluorooxyalklene units, where $R_f$ and $R'_f$, either equal to or different from each other, are —$CF_3$, —$C_2F_5$ or —$C_3F_7$, and m, n, p have such means values as to comply with the above characteristics of mean molecular weight and viscosity;

having a random distribution of the perfluorooxyalkylene units, where $R_f$ and $R'_f$, like or different from each other, are —$CF_3$ or —$C_2F_5$, and m and n have such mean values as to comply with the above said characteristics;

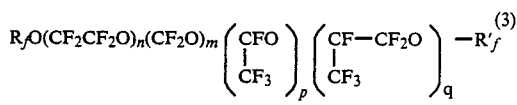

having a random distribution of the perfluorooxyalkylene units, where $R_f$ and $R'_f$, either like or different from each other, are —$CF_3$. —$C_2F_5$ or $C_3F_7$, and m, m, p, q have such mean values as to comply with the above characteristics;

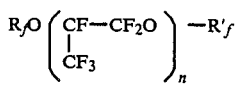

where $R_f$ or $R'_f$, like or different from each other, are —$C_2F_5$ or —$C_3F_7$, and n has such a value as to comply with the above characteristics;

where $R_f$ and $R'_f$, like or different from each other, are —$CF_3$, or —$C_2F_5$, and n has such a mean value as to comply with the above characteristics;

where $R_f$ and $R'_f$, like or different from each other, are —$CF_3$ or —$C_2F_5$ or —$C_3F_7$, n having such a mean value as to comply with the above said characteristics; and

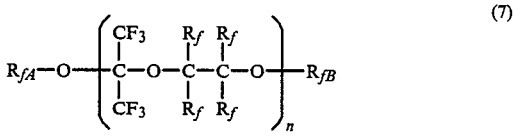

and

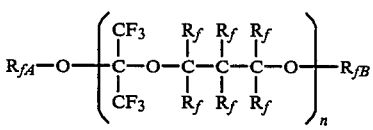

where $R_f$ is F or perfluoroalkyl, $R_{fA}$ and $R_{fB}$, either like or different from each other, are perfluoroalkyl, and n has such mean value as to comply with the above characteristics.

2. The process according to claim 1, wherein the surfactant belongs to the closs of the perfluoropolyethers having an acid end group.

3. The process according to claim 1, wherein $C_2F_4$ is copolymerized with $C_3F_6$ in such a ratio as to obtain a copolymer containing from 7% to 27% by weight of $C_3F_6$.

* * * * *

UNITED STATES PATENT AND TRADEMARK OFFICE
CERTIFICATE OF CORRECTION

PATENT NO. : 4,789,717
DATED : December 6, 1988
INVENTOR(S) : GIANNETTI et al.

It is certified that error appears in the above-identified patent and that said Letters Patent is hereby corrected as shown below:

On the Title Page, insert the following:

--[30] Foreign Application Priority Data

--April 29, 1986 (Italy) 20256 A/86--

Signed and Sealed this

Seventeenth Day of October, 1989

Attest:

DONALD J. QUIGG

Attesting Officer

Commissioner of Patents and Trademarks